(12) United States Patent
Ishikawa

(10) Patent No.: US 11,228,214 B2
(45) Date of Patent: Jan. 18, 2022

(54) MOTOR, FAN, COMPRESSOR, AND AIR CONDITIONING APPARATUS

(71) Applicant: Mitsubishi Electric Corporation, Tokyo (JP)

(72) Inventor: Atsushi Ishikawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 487 days.

(21) Appl. No.: 16/070,946

(22) PCT Filed: Apr. 6, 2016

(86) PCT No.: PCT/JP2016/061237
§ 371 (c)(1),
(2) Date: Jul. 18, 2018

(87) PCT Pub. No.: WO2017/175330
PCT Pub. Date: Oct. 12, 2017

(65) Prior Publication Data
US 2019/0089215 A1 Mar. 21, 2019

(51) Int. Cl.
*H02K 21/14* (2006.01)
*H02K 1/27* (2006.01)
(Continued)

(52) U.S. Cl.
CPC ............ *H02K 1/2766* (2013.01); *H02K 1/26* (2013.01); *H02K 1/276* (2013.01); *H02K 1/2793* (2013.01);
(Continued)

(58) Field of Classification Search
CPC .... H02K 1/276; H02K 1/2766; H02K 1/2706; H02K 1/28; H02K 21/16
(Continued)

(56) References Cited

U.S. PATENT DOCUMENTS 3,942,055 A * 3/1976 Hoffmeyer ............. H02K 1/165
310/216.111
4,120,616 A * 10/1978 Dwyer .................. F04D 25/082
15/326
(Continued)

FOREIGN PATENT DOCUMENTS

CN 203691092 U 7/2014
EP 2 207 254 A2 7/2010
(Continued)

OTHER PUBLICATIONS

International Search Report of the International Searching Authority dated Jun. 28, 2016 for the corresponding International application No. PCT/JP2016/061237 (and English translation).
(Continued)

*Primary Examiner* — Terrance L Kenerly
(74) *Attorney, Agent, or Firm* — Posz Law Group, PLC

(57) ABSTRACT

A motor includes a stator and a rotor provided inside the stator. The stator includes a stator core, and a coil made of aluminum and wound around the stator core in distributed winding. The rotor includes a rotor core, and a first number of permanent magnets mounted in the rotor core. The coil of the stator is covered with varnish. The first number is greater than or equal to 6, and is less than or equal to 10. Each of the first number of permanent magnets of the rotor contains neodymium, iron, boron and dysprosium, and has a dysprosium content of 0% to 4% by weight.

10 Claims, 15 Drawing Sheets

(51) Int. Cl.
*H02K 1/26* (2006.01)
*H02K 15/02* (2006.01)

(52) U.S. Cl.
CPC .......... *H02K 15/024* (2013.01); *H02K 21/14* (2013.01); *H02K 2213/03* (2013.01)

(58) Field of Classification Search
USPC ...................................... 310/156.53, 156.57
See application file for complete search history.

(56) References Cited

U.S. PATENT DOCUMENTS

| | | | | |
|---|---|---|---|---|
| 6,218,753 | B1 * | 4/2001 | Asano | H02K 1/276 310/156.53 |
| 2002/0063487 | A1 * | 5/2002 | Leijon | H01F 27/34 310/179 |
| 2004/0004408 | A1 * | 1/2004 | Yamazaki | H02K 15/0037 310/184 |
| 2009/0261684 | A1 | 10/2009 | Onimaru et al. | |
| 2013/0227981 | A1 * | 9/2013 | Tsukino | F25B 49/005 62/222 |
| 2015/0256038 | A1 | 9/2015 | Nigo et al. | |

FOREIGN PATENT DOCUMENTS

| | | |
|---|---|---|
| JP | 2003-134712 A | 5/2003 |
| JP | 2009-261188 A | 11/2009 |
| JP | 2010-166643 A | 7/2010 |
| JP | 2012-050331 A | 3/2012 |
| JP | 2012-254019 A | 12/2012 |
| JP | 2015-065758 A | 4/2015 |
| JP | 2015-065803 A | 4/2015 |
| JP | 2015-223079 A | 12/2015 |
| WO | 2008/068876 A1 | 6/2008 |

OTHER PUBLICATIONS

Office action dated Jul. 2, 2019 issued in corresponding JP patent application No. 2018-510170 (and English translation thereof).
Office Action dated Jan. 7, 2020 issued in corresponding JP patent application No. 2018-510170 (and English translation).
Office Action dated Jul. 3, 2020 in connection with counterpart CN patent application No. 201680083414.2 (and English translation).
Office Action dated Dec. 14, 2019 issued in corresponding CN patent application No. 201680083414.2 (and English translation).

* cited by examiner

MOTOR, FAN, COMPRESSOR, AND AIR CONDITIONING APPARATUS

CROSS REFERENCE TO RELATED APPLICATION

This application is a U.S. national stage application of International Application No. PCT/JP2016/061237, filed on Apr. 6, 2016, the contents of which are incorporated herein by reference.

TECHNICAL FIELD

The present invention relates to a motor, a fan, a compressor, and an air conditioning apparatus.

BACKGROUND

In recent years, in order to reduce manufacturing cost of a motor, it is examined to change a coil wound around a stator from a commonly used copper wire to an aluminum wire (see, for example, patent reference 1).

PATENT REFERENCE

Patent Reference 1: Japanese Patent Application Publication No. 2010-166643 (Abstract)

However, the aluminum wire has a higher electrical resistance than the copper wire. For example, for the same wire diameter, the aluminum wire has an electrical resistance 1.6 times that of the copper wire. This poses a problem that loss (so-called copper loss) due to electrical resistance of the coils increases.

SUMMARY

The present invention is made to solve the above described problem, and an object of the present invention is to provide a motor capable of reducing manufacturing cost and suppressing loss due to electrical resistance.

A motor according to the present invention includes a stator and a rotor provided inside the stator. The stator has a stator core, and a coil made of aluminum and wound around the stator core in distributed winding. The rotor has a rotor core, and a first number of permanent magnets mounted in the rotor core. The coil of the stator is covered with varnish. The first number is greater than or equal to 6, and is less than or equal to 10. Each of the first number of permanent magnets of the rotor contains neodymium, iron, boron and dysprosium, and has a dysprosium content of 0 to 4 weight percent.

According to the present invention, manufacturing cost can be reduced by using the coil made of aluminum. Further, by setting the number of the permanent magnets (the first number) to 6 or more, demagnetization of the permanent magnets is less likely to occur. Further, by setting the dysprosium content to 0 to 4 weight percent, a residual magnetic flux density increases, a current value required to obtain a target output decreases, and thus loss (copper loss) due to electrical resistance can be reduced. Further, a strength of aluminum can be compensated by winding the coil in distributed winding and covering the coil with varnish.

DETAILED DESCRIPTION

Figure 1:
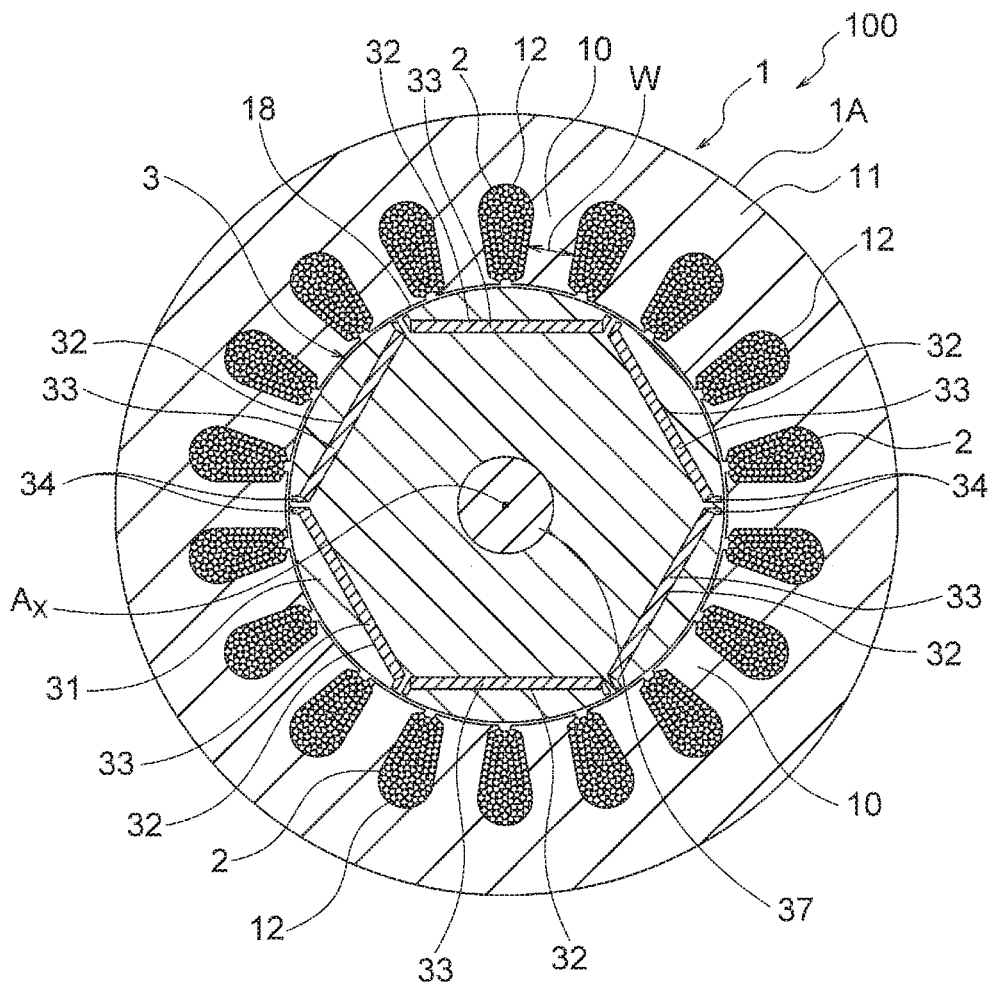
FIG. 1(A) is a sectional view showing a motor according to a first configuration example of a first embodiment.
FIG. 1(B) is an enlarged view showing a slot of the motor.
Figure 1:
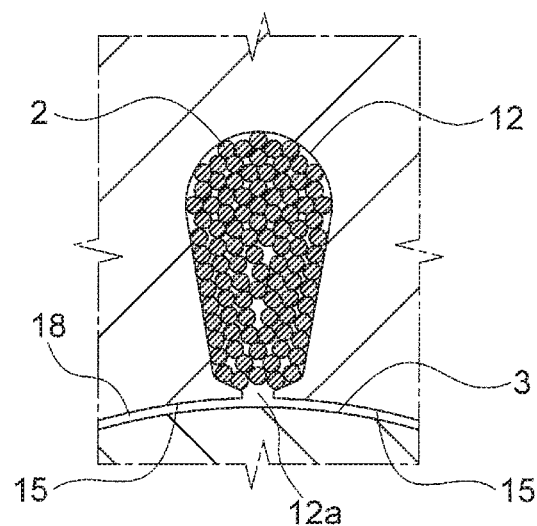

Embodiments of the present invention will be described below with reference to the drawings.

First Embodiment

FIG. 1(A) is a sectional view showing a motor 100 according to a first configuration example of a first embodiment. The motor 100 shown in FIG. 1(A) includes a stator 1 and a rotor 3 rotatably provided inside the stator 1. An air gap 18 is provided between the stator 1 and the rotor 3.

The rotor 3 includes a cylindrical rotor core 31 having a plurality of magnet insertion holes 32, and permanent magnets 33 placed in the respective magnet insertion holes 32. The rotor core 31 is made of, for example, electromagnetic steel sheets, each of which has a thickness of 0.1 to 0.7 mm, stacked in a direction of a rotational axis and fixed together by crimping or the like. A circular shaft hole is formed at a center of the rotor core 31 in a radial direction. A shaft 37 serving as a rotation shaft is fixed to the shaft hole by press fitting. A center axis Ax of the shaft 37 defines a rotational axis of the rotor 3.

A direction along an outer circumference (circular circumference) of the rotor core 31 will be referred to as a "circumferential direction" hereinafter. An axial direction of the rotor core 31 (that is, a direction of the center axis Ax of the shaft 37) will be referred to as an "axial direction" hereinafter. A radial direction of the rotor core 31 will be referred to as a "radial direction" hereinafter.

A plurality of (in this example, six) magnet insertion holes 32 are formed at equal intervals in the circumferential direction of the rotor core 31. The magnet insertion hole 32 is a groove extending linearly in a plane perpendicular to the axial direction. Each magnet insertion hole 32 faces three of slots 12 (described later) formed in a stator core 1A. The magnet insertion holes 32 are located as close as possible to an outer circumferential surface of the rotor core 31.

The permanent magnets 33 are placed in the magnet insertion holes 32. The permanent magnet 33 is a flat plate member having a length in the axial direction, a width in the circumferential direction (more specifically, a direction perpendicular to the radial direction), and a thickness in the radial direction. The number of the permanent magnets 33 in the rotor 3 is defined as a first number.

In the motor 100 shown in FIG. 1(A), one permanent magnet 33 is placed in each of the six magnet insertion holes 32. The permanent magnets 33 form magnetic poles of the rotor 3, and the number (first number) of the permanent magnets 33 is equal to the number of the poles of the rotor 3. In other words, in FIG. 1(A), the number of the poles of the rotor 3 is 6. However, the number of the poles of the rotor 3 is not limited to 6, and need only be in a range of 6 to 10. This will be described later.

The permanent magnet 33 is made of a rare-earth magnet containing neodymium (Nd), iron (Fe) and boron (B) as main ingredients, and contains 0 to 4 weight percent of dysprosium (Dy). The purpose of addition of dysprosium is to enhance a coercive force.

The permanent magnet 33 is magnetized to have opposite magnetic poles on radially outer and inner sides of the rotor core 31. Further, the permanent magnets 33 adjacent to each other in the circumferential direction are magnetized in opposite directions. For example, when a certain permanent magnet 33 is magnetized so that its north pole faces radially outward and its south pole faces radially inward, the permanent magnet 33 adjacent thereto in the circumferential direction is magnetized so that its south pole faces radially outward and its north pole faces radially inward.

Flux barriers 34 are respectively formed at both ends of the magnet insertion hole 32 in the circumferential direction. The flux barriers 34 are openings radially extending toward an outer circumference of the rotor core 31 from the ends of the magnet insertion hole 32 in the circumferential direction. The flux barriers 34 are provided in order to suppress leakage magnetic flux between adjacent magnetic poles (that is, magnetic flux flowing through an inter-pole part).

The stator 1 includes a stator core 1A and coils 2 wound around the stator core 1A in distributed winding. The stator core 1A is made of, for example, electromagnetic steel sheets, each of which has a thickness of 0.1 to 0.7 mm, stacked in the axial direction and fixed together by crimping or the like.

The stator core 1A has an annular yoke portion 11 and a plurality of (in this example, 18) teeth 10 protruding radially inward from the yoke portion 11. A plurality of (in this example, 9) coils 2 made of aluminum wires are wound around the teeth 10.

The tooth 10 radially extends with a constant width W (a length in the circumferential direction), and has a wide tip part 15 (FIG. 1(B)) at its tip. Slots 12 are formed between adjacent teeth 10. The number of the slots 12 (in this example, 18) is equal to that of the teeth 10.

FIG. 1(B) is an enlarged view showing the slot 12 between adjacent teeth 10. The slot 12 accommodates the coil 2 wound around the teeth 10. An opening 12a serving as an entrance to the slot 12 is formed between the tip parts 15 of the adjacent teeth 10.

Next, the coils 2 will be described. The coils 2 are made of aluminum wires. A price of the aluminum wire per unit weight is of the same level as that of a commonly used copper wire, but a specific gravity of the aluminum wire is about ⅓ that of the copper wire. Thus, cost of the aluminum wire is about ⅓ that of the copper wire for the same use amount. In other words, manufacturing cost can be reduced by using the coils 2 made of aluminum wires.

The aluminum wire has an electrical resistivity 1.6 times that of the copper wire. Therefore, when the coils 2 are made of the aluminum wires, reduction of loss (so-called copper loss) due to electrical resistance becomes an issue.

Figure 2:
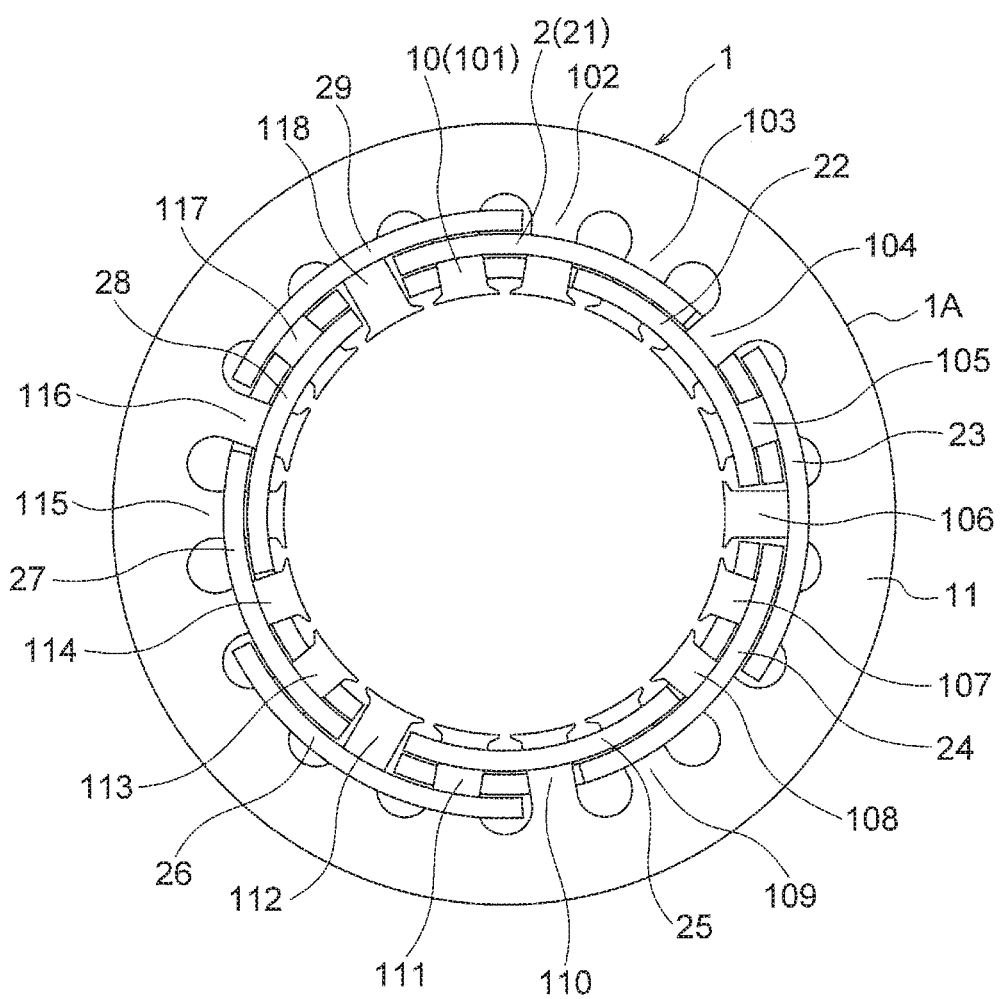
FIG. 2 is a plan view schematically showing a winding pattern of a coil of the motor shown in FIG. 1.
Figure 3:
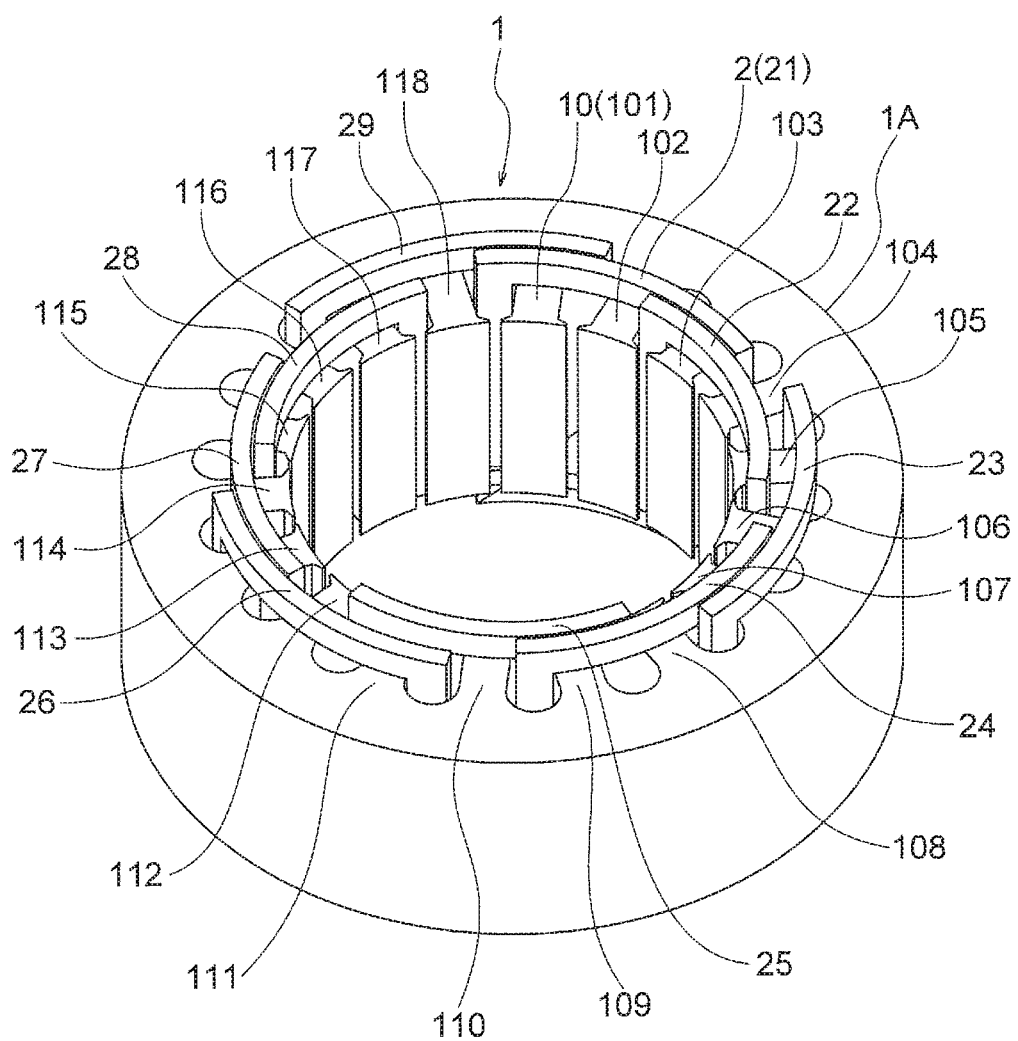
FIG. 3 is a perspective view schematically showing the winding pattern of the coil of the motor shown in FIG. 1.
Figure 18:
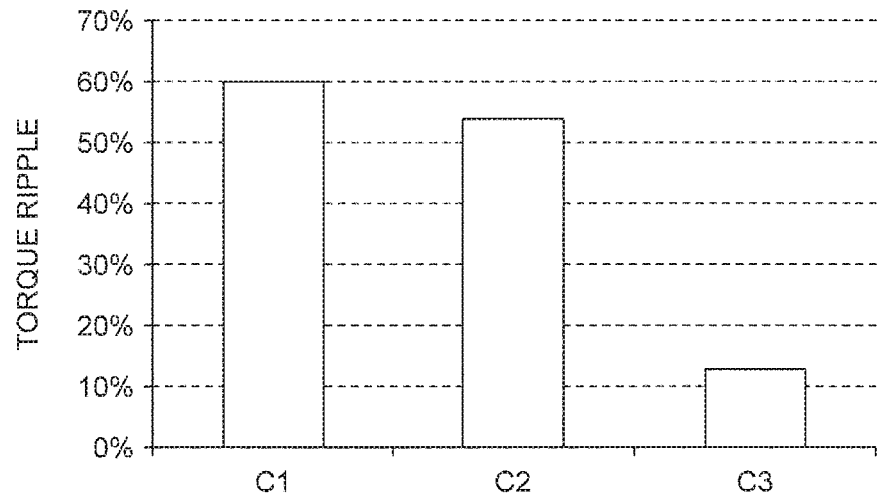
FIG. 18 is a graph showing a value of a torque ripple in each of the rotor having no slit, the rotor having the first slits, and the rotor having the first and second slits.

FIGS. 2 and 3 are a plan view and a perspective view schematically showing a winding pattern of the coils 2 of the stator 1. In FIGS. 2 and 3, 18 teeth 10 are assigned with reference numerals 101 to 118, and 9 coils 2 are assigned with reference numerals 21 to 29.

The coils 21 to 29 are provided, three for each of phases (U-phase, V-phase and W-phase). The coils 21 to 23 are, for example, U-phase coils, the coils 24 to 26 are, for example, V-phase coils, and the coils 27 to 29 are, for example, W-phase coils. Each of the coils 21 to 29 is wound across three teeth 10.

For example, the coil 21 is wound across the teeth 101 to 103, the coil 22 is wound across the teeth 103 to 105, and the coil 23 is wound across the teeth 105 to 107.

Similarly, the coil 24 is wound across the teeth 107 to 109, the coil 25 is wound across the teeth 109 to 111, and the coil 26 is wound across the teeth 111 to 113. The coil is wound across the teeth 113 to 115, the coil 28 is wound across the teeth 115 to 117, and the coil 29 is wound across the teeth 117, 118 and 101.

Incidentally, the winding pattern of the coils 2 is not limited to the example described herein, and any winding pattern may be used as long as the coils 2 are wound in distributed winding.

Ends (coil ends) of the coils 2 in the axial direction protrude outward from ends of the stator core 1A in the axial direction. In order to suppress deformation of the coils 2 when the coils 2 are applied with an external force, the coils 2 are reinforced by being impregnated with varnish (electrically insulating varnish).

Varnish impregnation is performed by, for example, dipping the stator core 1A around which the coils 2 are wound in a bath filled with varnish. Therefore, not only the coil ends but also the coils 2 in the slots 12 are impregnated with varnish.

The aluminum wire forming the coil 2 has a characteristic such that its surface is susceptible to oxidization, but the surface oxidation can be prevented since the coil 2 is coated (covered) with varnish.

The distributed winding has a characteristic such that spatial harmonics can be reduced as compared with concentrated winding, and therefore Joule loss (iron loss) due to eddy current generated in the stator core 1A can be reduced.

When the distributed winding is used, the teeth 10 forming magnetic paths are dispersedly arranged as compared with when the concentrated winding is used, and therefore magnetic paths for q-axis magnetic flux are easily provided and a q-axis inductance increases. Thus, a reluctance torque is more likely to be generated as compared with when the concentrated winding is used.

Here, a torque T generated in the motor 100 is represented by:

(Mathematical Expression 1)

$$T=P_n\{\Psi_a i_q+(L_q-L_d)i_d i_q\} \qquad (1)$$

where $P_n$ is the number of the poles, $\Psi_a$ is an interlinkage magnetic flux, $L_d$ is a d-axis inductance, $L_q$ is a q-axis inductance, $i_d$ is a d-axis current, and $i_q$ is a q-axis current.

The first term of the equation (1) represents a magnet torque. The magnet torque is a product of the interlinkage magnetic flux $\Psi_a$ generated by the permanent magnet and the q-axis current $i_q$. The second term represents a reluctance torque generated by an attraction force between the stator core 1A and the rotor core 31. As a difference between the q-axis inductance $L_q$ and the d-axis inductance $L_d$ of the motor is larger, the reluctance torque is larger.

As described above, since the reluctance torque is more likely to be generated when the distributed winding is used, both of the magnet torque and the reluctance torque can be used. Therefore, only a small magnetic force is required to produce a target output (torque). Thus, a current value to be supplied to the coils 2 can be reduced, and loss (copper loss) due to electrical resistance can be reduced.

Figure 4:
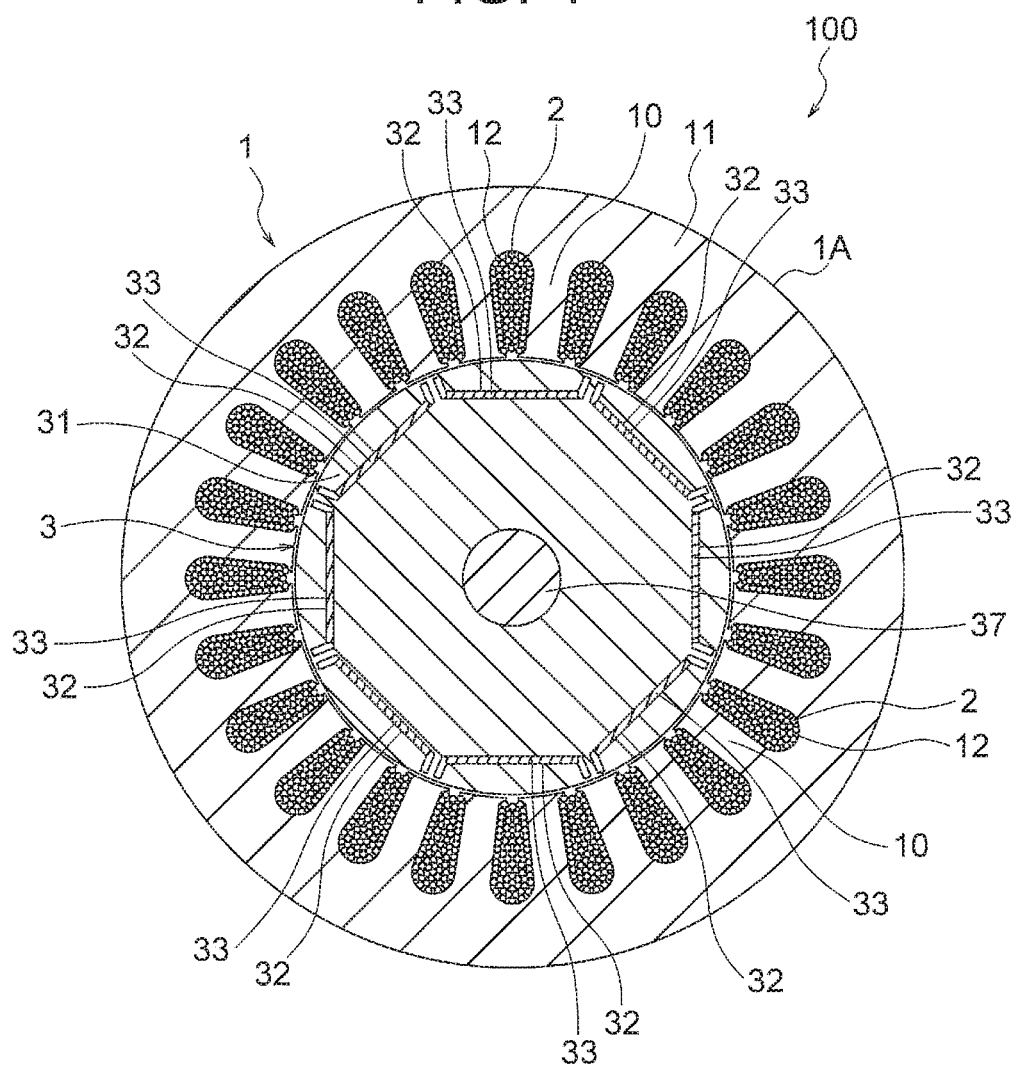
FIG. 4 is a sectional view showing a motor according to a second configuration example of the first embodiment.
Figure 5:
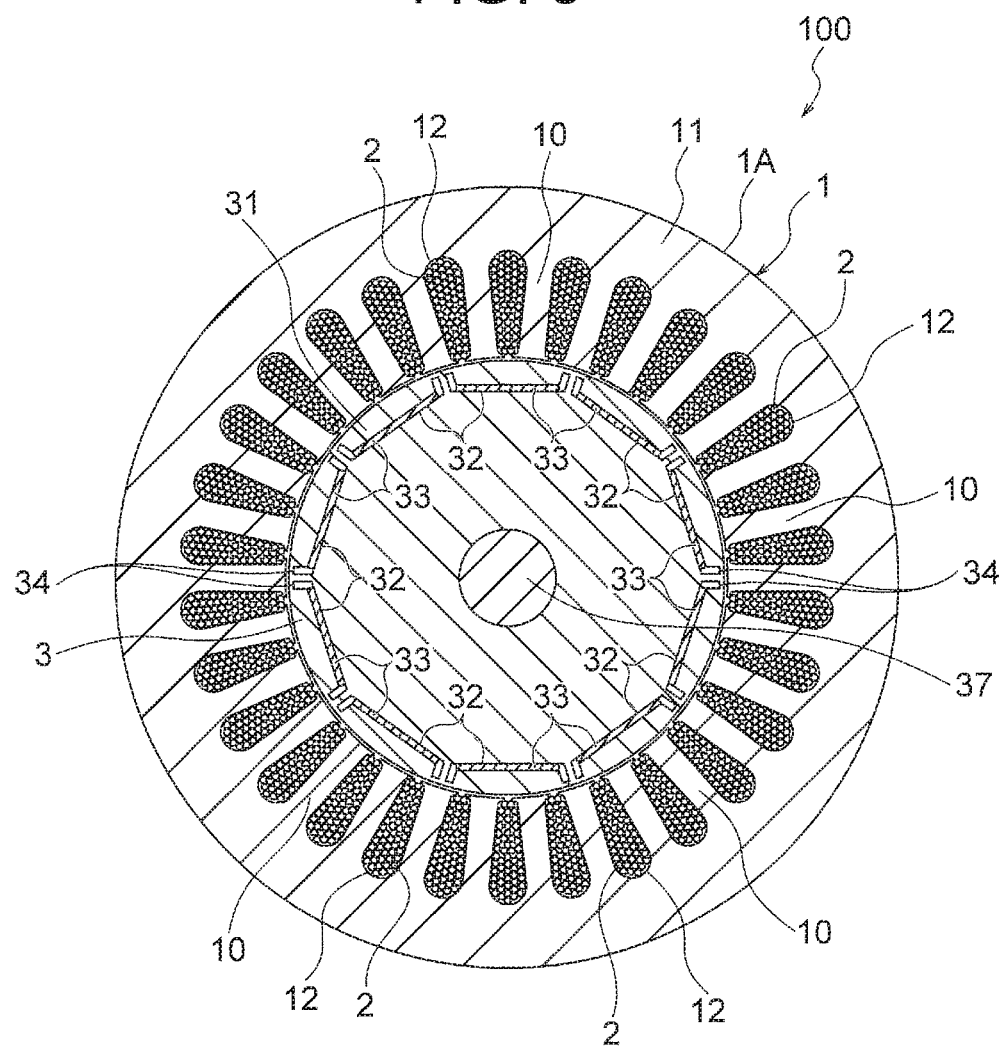
FIG. 5 is a sectional view showing a motor according to a third configuration example of the first embodiment.
Figure 6:
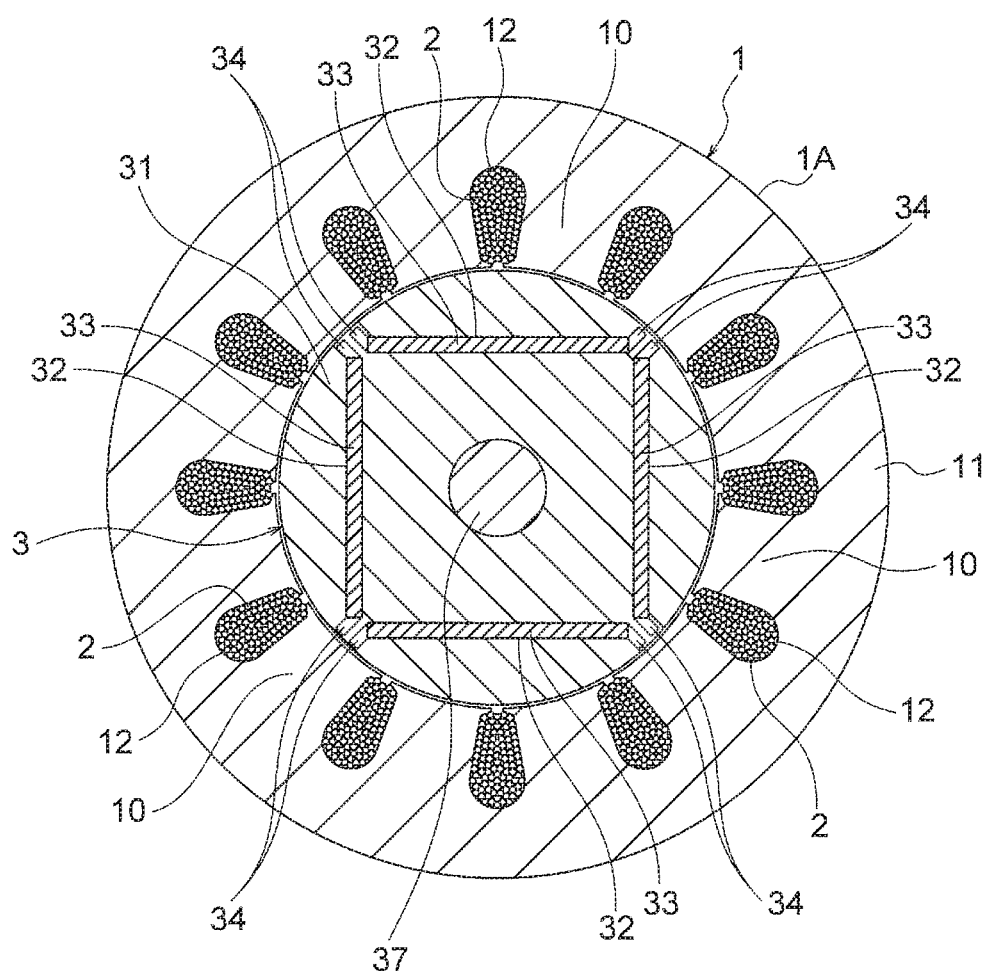
FIG. 6 is a sectional view showing a configuration of a motor of a comparative example.

Next, the number of the poles of the motor 100 will be described. FIG. 4 is a sectional view showing a motor 100 according to a second configuration example of the first embodiment. FIG. 5 is a sectional view showing a motor 100 according to a third configuration example of the first embodiment. FIG. 6 is a sectional view showing a motor of a comparative example.

In the second configuration example shown in FIG. 4, the number of the poles of the rotor 3 is 8. In other words, 8 permanent magnets 33 are provided in the rotor 3. More specifically, the rotor core 31 has 8 magnet insertion holes arranged at equal intervals in the circumferential direction. Each magnet insertion hole 32 faces three of the slots 12 of the stator core 1A.

In this second configuration example, since the number of magnet insertion holes 32 is larger, a length of each magnet insertion hole 32 in the circumferential direction is shorter, as compared with the first configuration example shown in FIG. 1(A). Therefore, the magnet insertion holes 32 are located closer to the outer circumferential surface of the rotor core 31 than in the first configuration example. As is the case with the magnet insertion hole 32, a length of the permanent magnet 33 in the circumferential direction is also shorter than in the first configuration example (FIG. 1(A)).

The stator core 1A has 24 slots 12, whose number is three times the number of the poles. Accordingly, a width of each tooth 10 is narrower than in the first configuration example shown in FIG. 1(A). The coils 2 are wound around respective teeth 10 in the distributed winding and impregnated with varnish.

In the third configuration example shown in FIG. 5, the number of the poles of the rotor 3 is 10. In other words, 10 permanent magnets 33 are provided in the rotor 3. More specifically, the rotor core 31 has 10 magnet insertion holes 32 arranged at equal intervals in the circumferential direction. Each magnet insertion hole 32 faces three of the slots 12 of the stator core 1A.

In this third configuration example, since the number of magnet insertion holes 32 is further larger, a length of each magnet insertion hole 32 in the circumferential direction is further shorter, as compared with the second configuration example shown in FIG. 4. Therefore, the magnet insertion holes 32 are located further closer to the outer circumferential surface of the rotor core 31 than in the second configuration example. As is the case with the magnet insertion hole 32, a length of the permanent magnet 33 in the circumferential direction is also shorter than in the second configuration example (FIG. 4).

The stator core 1A has 30 slots 12, whose number is three times the number of the poles. Accordingly, a width of each tooth 10 is further narrower than in the second configuration example shown in FIG. 4. The coils 2 are wound around the respective teeth 10 in the distributed winding and impregnated with varnish.

In the comparative example shown in FIG. 6, the number of the poles of the rotor 3 is 4. In other words, 4 permanent magnets 33 are provided in the rotor 3. More specifically, the rotor core 31 has 4 magnet insertion holes arranged at equal intervals in the circumferential direction. Each magnet insertion hole 32 faces three of the slots 12 of the stator core 1A.

In this comparative example, since the number of the magnet insertion holes 32 is smaller, a length of each magnet insertion hole 32 in the circumferential direction is longer, as compared with the first configuration example shown in FIG. 1(A). Therefore, the magnet insertion holes are located farther from the outer circumferential surface of the rotor core 31 than in the first configuration example. As is the case with the magnet insertion hole 32, a length of the permanent magnet 33 in the circumferential direction is also longer than in the first configuration example (FIG. 1(A)).

The stator core 1A has 12 slots 12, whose number is three times the number of the poles. Accordingly, a width of each tooth 10 is wider than in the first configuration example shown in FIG. 1(A). The coils 2 are wound around the respective teeth 10 in the distributed winding and impregnated with varnish.

In the rotor 3 in which the number of the poles is greater than or equal to 6, demagnetization of the permanent magnets 33 is less likely to occur, as compared with the rotor 3 in which the number of the poles is 4. This is because an amount of demagnetizing magnetic flux acting on one permanent magnet 33 (magnetic flux generated by current of the coil 2 and causing demagnetization of the permanent magnet 33) decreases as the number of the poles increases. In this way, demagnetization of the permanent magnet becomes less likely to occur as the number of the poles increases, and therefore content of dysprosium added for enhancing a coercive force can be reduced.

Figure 7:
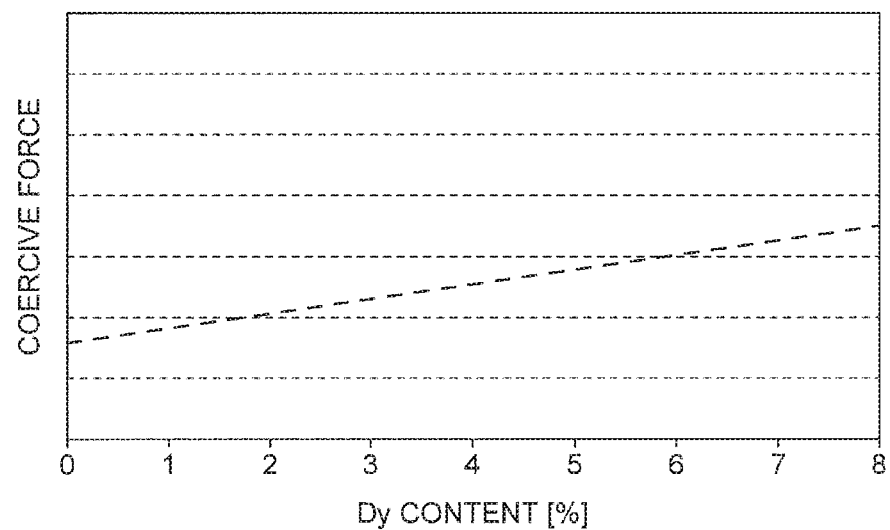
FIGS. 7(A) and 7(B) are graphs showing a relationship between a dysprosium content and a coercive force and a relationship between the dysprosium content and a residual magnetic flux density.
Figure 7:
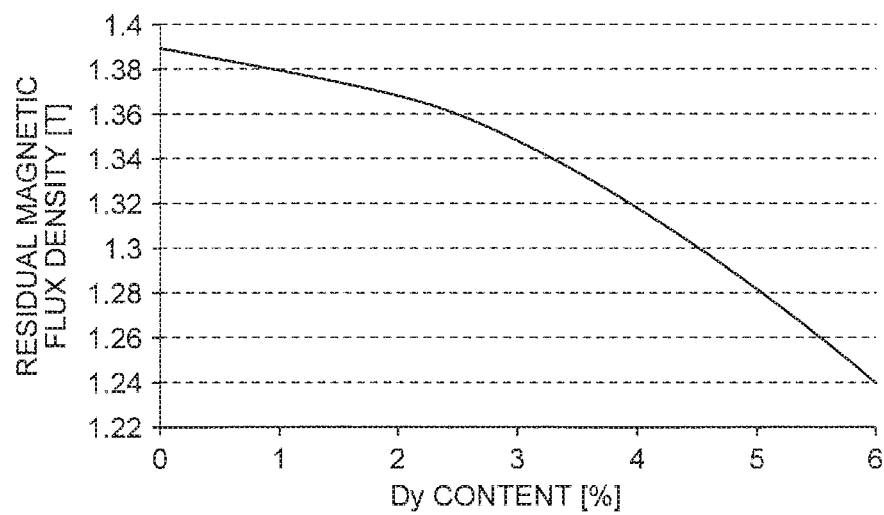

FIG. 7(A) is a graph showing a relationship between a dysprosium content and a coercive force. FIG. 7(A) only shows a tendency of change in coercive force with respect to the dysprosium content. FIG. 7(B) is a graph showing a relationship between the dysprosium content and a residual magnetic flux density. Values of the residual magnetic flux density are merely examples.

From FIGS. 7(A) and (B), it is understood that, as the dysprosium content increases, the coercive force increases nearly proportionally to the dysprosium content, but the residual magnetic flux density decreases. For example, when the dysprosium content increases from 0 to 6 weight percent, the residual magnetic flux density decreases from 1.39 T (Tesla) to 1.24 T.

As described above, dysprosium enhances the coercive force, but lowers the residual magnetic flux density. Accordingly, the residual magnetic flux density can be increased by reducing the dysprosium content. As a result, only a small current value is required to obtain a target output, and loss (copper loss) due to electrical resistance can be reduced.

In this embodiment, the dysprosium content of the rare-earth magnet forming the permanent magnet 33 is 0 to 4 weight percent (most preferably, 0%). From FIG. 7(B), when the dysprosium content is in a range of 0 to 4 weight percent, the residual magnetic flux density is in a range of 1.32 T to 1.39 T.

Since supply of dysprosium is unstable, a high dysprosium content tends to increase the manufacturing cost. Accordingly, reduction of dysprosium content leads to reduction of the manufacturing cost.

Furthermore, as the number of the poles is greater than or equal to 6, the permanent magnets 33 are located closer to the outer circumference of the rotor core 31, as compared with the comparative example (FIG. 6) in which the number of the poles is 4. As a result, a wide region can be provided on a radially inner side of the permanent magnets 33.

Figure 8:
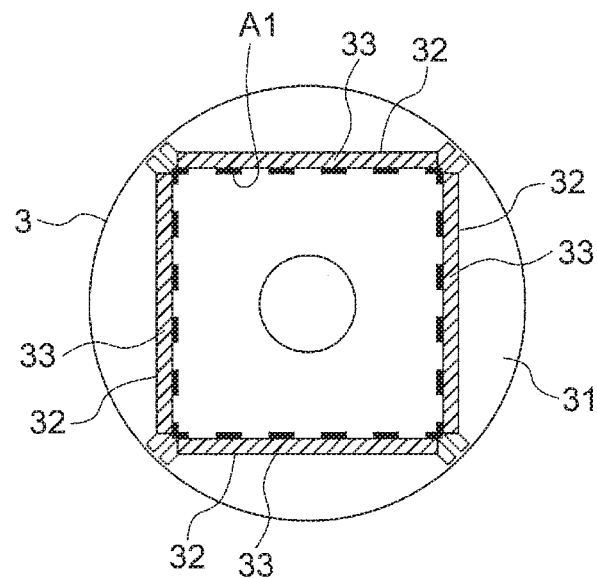
FIGS. 8(A) and 8(B) are schematic views for describing a relationship between the number of permanent magnets and a rotor inner-diameter-side area.
Figure 8:
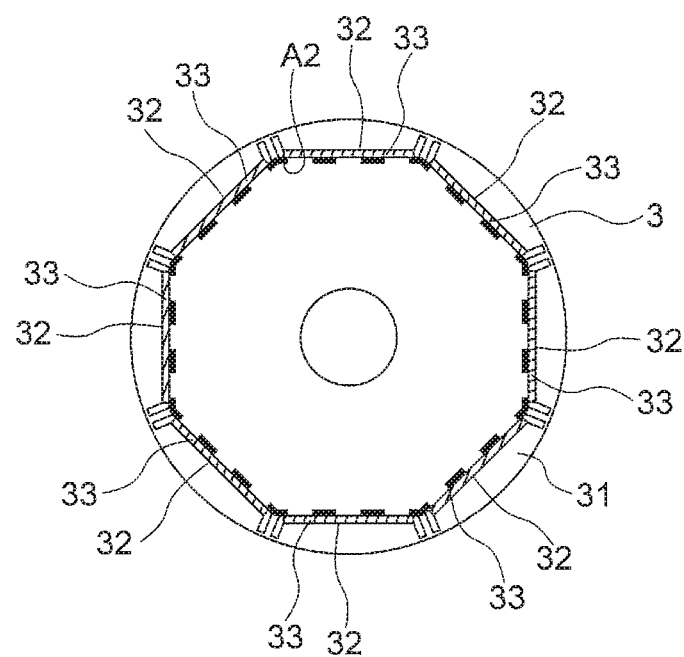

FIGS. 8(A) and 8(B) are views showing a comparison of an area on the radially inner side of the permanent magnets 33 between the rotor 3 (having 4 poles) of the comparative example shown in FIG. 6 and the rotor 3 (having 8 poles) of the second configuration example shown in FIG. 4. In the rotor 3 having 4 poles, a square region is provided on the radially inner side of the permanent magnets 33 as shown in FIG. 8(A). The area of this region is defined as a rotor inner-diameter-side area A1. In the rotor 3 having 8 poles, an octagonal region is provided on the radially inner side of the permanent magnets 33 as shown in FIG. 8(B). The area of this region is defined as a rotor inner-diameter-side area A2.

When FIGS. 8(A) and 8(B) are compared with each other, it is understood that the rotor inner-diameter-side area A2 of the rotor 3 having 8 poles is larger than the rotor inner-diameter-side area A1 of the rotor 3 having 4 poles.

Figure 9:
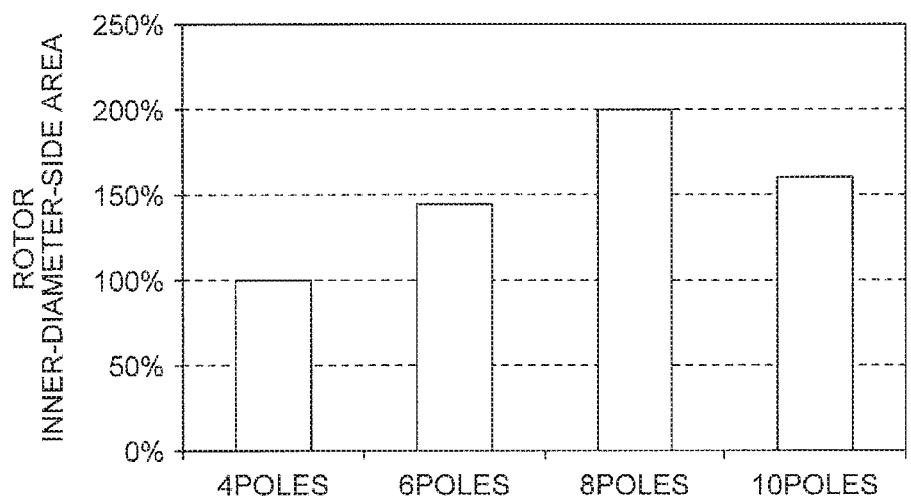
FIG. 9 is a graph showing a relationship between the number of the permanent magnets and the rotor inner-diameter-side area.

FIG. 9 is a graph showing a relationship between the number of the poles of the rotor 3 and the rotor inner-diameter-side area. The rotor inner-diameter-side area does not monotonically increase with an increase in the number of the poles, but reaches a peak at 8 poles and then decreases. In other words, the rotor inner-diameter-side area of the rotor 3 having 10 poles is smaller than that of the rotor 3 having 8 poles. Therefore, it is preferable that the number of the poles is greater than or equal to 6, and is less than or equal to 10, in order to provide a large rotor inner-diameter-side area.

Figure 10:
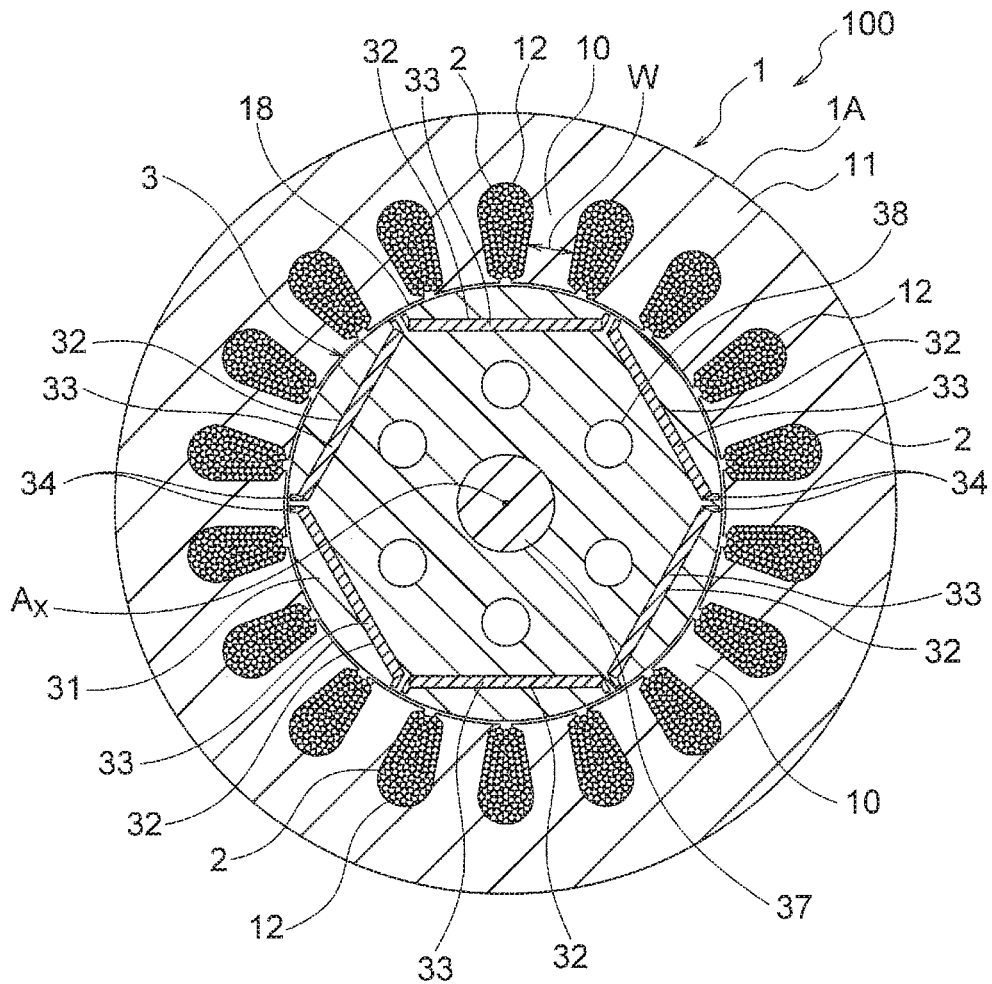
FIG. 10 is a sectional view showing a configuration in which through-holes are provided in a rotor of the motor according to the first embodiment.

FIG. 10 is a sectional view showing a configuration of the rotor 3 of the motor 100 shown in FIG. 1(A) provided with through-holes 38 in a region on the radially inner side of the permanent magnets 33. When the motor 100 is used in a compressor (see FIG. 20) of a refrigeration cycle, the through-holes 38 penetrating the rotor core 31 in the axial direction are provided as refrigerant passages. As a total area of the through-holes 38 increases, a flow rate of refrigerant passing through the through-holes 38 increases, and thus compression efficiency increases and efficiency of the refrigeration cycle increases. Accordingly, making the rotor inner-diameter-side area (that is, an area of the region in which the through-holes 38 can be formed) larger is advantageous in terms of enhancing the efficiency of the refrigeration cycle.

In the first embodiment, a large rotor inner-diameter-side area is provided by setting the number (first number) of the permanent magnets 33 of the rotor 3 in a range of 6 to 10 (6 to 10 poles). This enhances the compression efficiency when the motor 100 is used in the compressor and enhances the efficiency of the refrigeration cycle.

Further, when the rotor 3 has 6 poles or more, a winding length of the coil 2 can be reduced as compared with when the rotor 3 has 4 poles. The winding length of the coil 2 means a length of the coil 2 wound around the tooth 10. Shortening the winding length of the coil 2 contributes to reducing loss (copper loss) due to electrical resistance of the coil 2. The winding length of the coil 2 will be described below.

Figure 11:
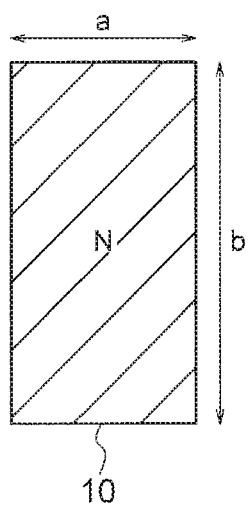
FIGS. 11(A) and 11(B) are schematic views for describing a relationship between a cross-sectional area of a tooth and a winding length of the coil.
Figure 11:
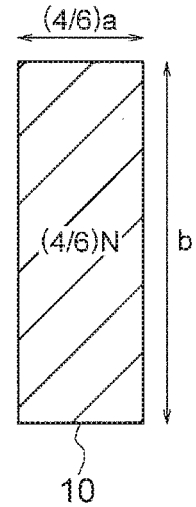

FIG. 11(A) is a schematic view for describing the winding length of one coil 2 wound around the tooth 10 of the rotor 3 having 4 poles (FIG. 6). FIG. 11(B) is a schematic view for describing the winding length of one coil 2 wound around the tooth 10 of the rotor 3 having 6 poles (FIG. 1).

As shown in FIG. 11(A), a cross section of the tooth 10 of the rotor 3 having 4 poles is a rectangle having a width "a", i.e., a length in the circumferential direction and a length "b" in the axial direction. In the rotor 3 having 6 poles, the number of teeth 10 is increased from 12 to 18 (that is, in proportion to the number of the poles). Accordingly, the length (a slot pitch) of one tooth 10 in the circumferential direction is reduced to 4/6, as shown in FIG. 11(B). The length (b) of the tooth 10 in the axial direction is constant regardless of the number of the poles.

In order to maintain the magnetic flux density of the tooth 10 constant, it is necessary that an amount of magnetic flux passing through one tooth 10 is inversely proportional to the number of the poles. Since the amount of magnetic flux is proportional to the number of turns of one coil 2, the number of turns of one coil 2 is inversely proportional to the number of the poles. Thus, when the number of turns of one coil 2 of the rotor 3 having four poles is expressed as N, the number of turns of one coil 2 of the rotor 3 having 6 poles is (4/6)×N.

When the winding length of one coil 2 of the rotor 3 having 4 poles is expressed as $L_4$, the winding length $L_4$ is represented by the following equation (2):

(Mathematical Expression 2)

$$L_4 = (2a+2b) \times N \times 4 = 8N(a+b) \quad (2)$$

Similarly, when the rotor 3 has 6 poles, the length of the tooth 10 in the circumferential direction is (4/6)a, the length of the tooth 10 in the axial direction is b, and the number of turns is (4/6)N, and therefore the winding length $L_6$ of one coil 2 is represented by the following equation (3):

(Mathematical Expression 3)

$$L_6 = \{(2 \times 4/6 a) + 2b\} \times 4/6 N \times 6 = 8N(4/6 a + b) = L_4 - 8/3 aN \quad (3)$$

Further, when the number of the poles of the rotor 3 is expressed as p, the length of the tooth 10 in the circumferential direction is (4/p)a, the length of the tooth 10 in the axial direction is b, and the number of turns is (4/p)N. Thus, the winding length $L_p$ of one coil 2 is represented by the following equation (4):

(Mathematical Expression 4)

$$L_p = \left\{\left(2 \times \frac{4}{p}a\right) + 2b\right\} \times \frac{4}{p}N \times p = 8N\left(\frac{4}{p}a + b\right) = L_4 - \left(8 - \frac{32}{p}\right)aN \quad (4)$$

From the equations (2) to (4), it is understood that the winding length $L_p$ of the coil 2 decreases as the number of the poles p increases.

Figure 12:
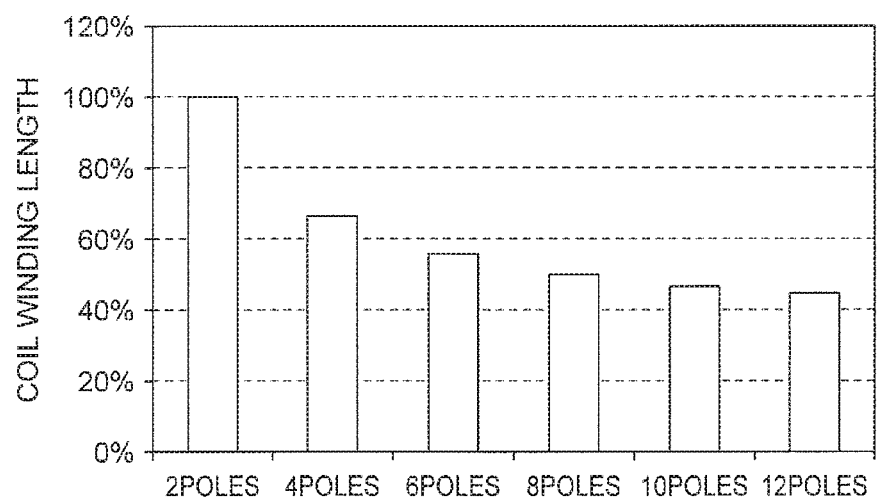
FIG. 12 is a graph showing a relationship between the number of the permanent magnets and the winding length of the coil.

FIG. 12 is a graph showing a calculation result of the winding length $L_p$ of the coil 2 when the number of the poles is changed from 2 to 12. Here, the length a of the tooth 10 in the circumferential direction is 60 mm, the length b of the tooth 10 in the axial direction is 60 mm, and the number of turns N is 30 for the rotor 3 having 4 poles.

From FIG. 12, it is understood that as the number of the poles of the rotor 3 increases from 4 to 6, the winding length of one coil 2 is reduced by 16.7%. Further, it is understood that when the number of the poles is greater than 10, the decrease in the winding length of the coil 2 levels off with respect to the increase in the number of poles, that is, saturation state is reached.

From this result, it is understood that when the number of the poles of the rotor 3 is in a range of 6 to 10 (that is, the number of the permanent magnets 33 is in a range of 6 to 10), the winding length of the coil 2 can be shortened, and loss (copper loss) due to the electrical resistance of the coil 2 can be reduced.

In each of the above described configuration examples of the first embodiment, the number (first number) of the permanent magnets 33 is equal to the number (second number) of the magnet insertion holes 32. However, since a configuration in which at least two permanent magnets 33 are inserted into one magnet insertion hole 32 is also possible, the number (second number) of the magnet insertion holes 32 may be smaller than the number (first number) of the permanent magnets 33.

As described above, in the motor 100 of the first embodiment of the present invention, the coils 2 made of aluminum are wound around the stator core 1A in the distributed winding and covered with varnish. The number (first number) of the permanent magnets 33 of the rotor 3 is greater than or equal to 6, and is less than or equal to 10. The permanent magnet 33 contains neodymium, iron, boron and dysprosium, and have a dysprosium content of 0 to 4 weight percent.

By setting the number of the permanent magnets 33 in a range of 6 to 10 (6 to 10 poles) in this way, demagnetization of the permanent magnets is less likely to occur, and the dysprosium content can be reduced to as low as 0 to 4 weight percent. As the dysprosium content is reduced, the residual magnetic flux density of the permanent magnets 33 increases, and thus a current value required to obtain a target output decreases. Thus, loss due to electrical resistance, that is, copper loss can be reduced.

Further, as the number of the poles is increased, the winding length of the coil 2 is reduced, and the electrical resistance of the coil 2 decreases. Thus, copper loss can be further reduced.

Further, since the number of the permanent magnets 33 is in a range of 6 to 10, a wide region can be provided on the radially inner side of the permanent magnets 33 of the rotor 3. Thus, through-holes 38 provided in this region of the rotor 3 can be made larger, and the compression efficiency of the compressor employing the motor 100 can be enhanced.

Further, since the coils 2 are wound in the distributed winding and impregnated with varnish (covered with varnish), the aluminum wire can be reinforced and surface oxidation can be suppressed.

Further, since the magnet insertion holes 32 of the rotor 3 extend linearly in a plane perpendicular to the axial direction of the rotor core 31, a wide region can be easily provided on the radially inner side of the magnet insertion holes 32.

Further, since the rotor 3 has the flux barriers 34 (openings) on the ends of the magnet insertion hole 32 in the circumferential direction, and the flux barriers 34 extend toward the outer circumferential surface of the rotor core 31, the leakage magnetic flux between adjacent magnetic poles can be suppressed.

Second Embodiment

Next, a second embodiment of the present invention will be described. In the second embodiment, a circumferentially extending slit 35 (first slit) is provided on a radially outer side of the magnet insertion hole 32 of the rotor core 31 in order to suppress leakage magnetic flux. Further, a radially extending slit 36 (second slits) is provided on the radially outer side of the magnet insertion hole 32 of the rotor core 31 in order to suppress torque ripple.

Figure 13:
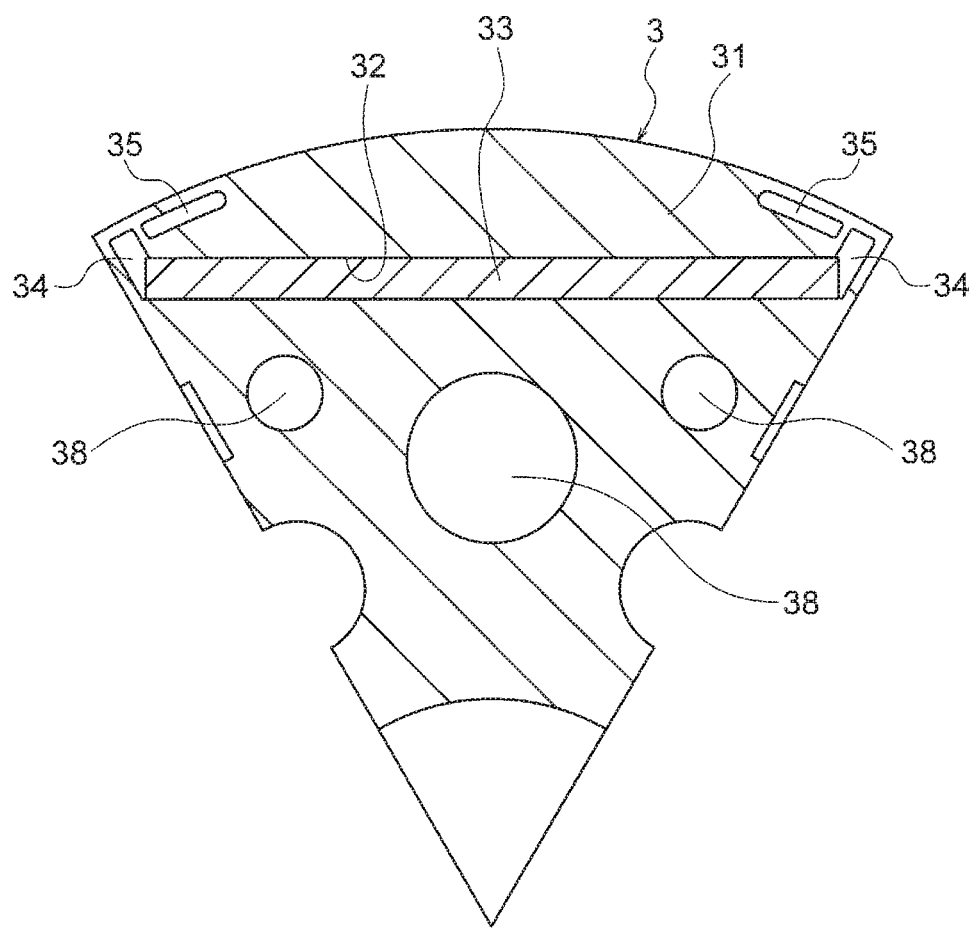
FIG. 13 is a sectional view showing a rotor according to a first configuration example of a motor of a second embodiment.

FIG. 13 is a partially enlarged sectional view showing a rotor 3 of a motor according to a first configuration example of the second embodiment. The slits 35 are provided on the radially outer side of the magnet insertion hole 32 of the rotor core 31. The slits 35 serve to suppress flow of magnetic flux to thereby increase magnetic resistance. The slit 35 has a shape elongated in the circumferential direction of the rotor core 31. The slits 35 are openings, but may be filled with nonmagnetic material.

The slits 35 are provided so that one slit 35 faces each end of the magnet insertion hole 32 in the circumferential direction. Further, the slits 35 are located at positions adjacent to and on circumferentially inner sides of two flux barriers 34 formed continuously with respective ends of the magnet insertion hole 32 in the circumferential direction.

By providing the slits 35 in this way, magnetic flux generated by the permanent magnet and flowing into adjacent permanent magnet 33 through an inter-pole part (the leakage magnetic flux between adjacent magnetic poles) can be suppressed.

Although FIG. 13 only shows a part of the rotor 3, the number of the permanent magnets 33 (that is, the number of the magnet insertion holes 32) of the rotor 3 need only be greater than or equal to 6, and less than or equal to 10. The through-holes 38 as described in the first embodiment are provided on the radially inner side of the magnet insertion holes 32 of the rotor core 31. Other structures of the rotor 3 and a configuration of a stator are the same as those in the first embodiment.

Figure 14:
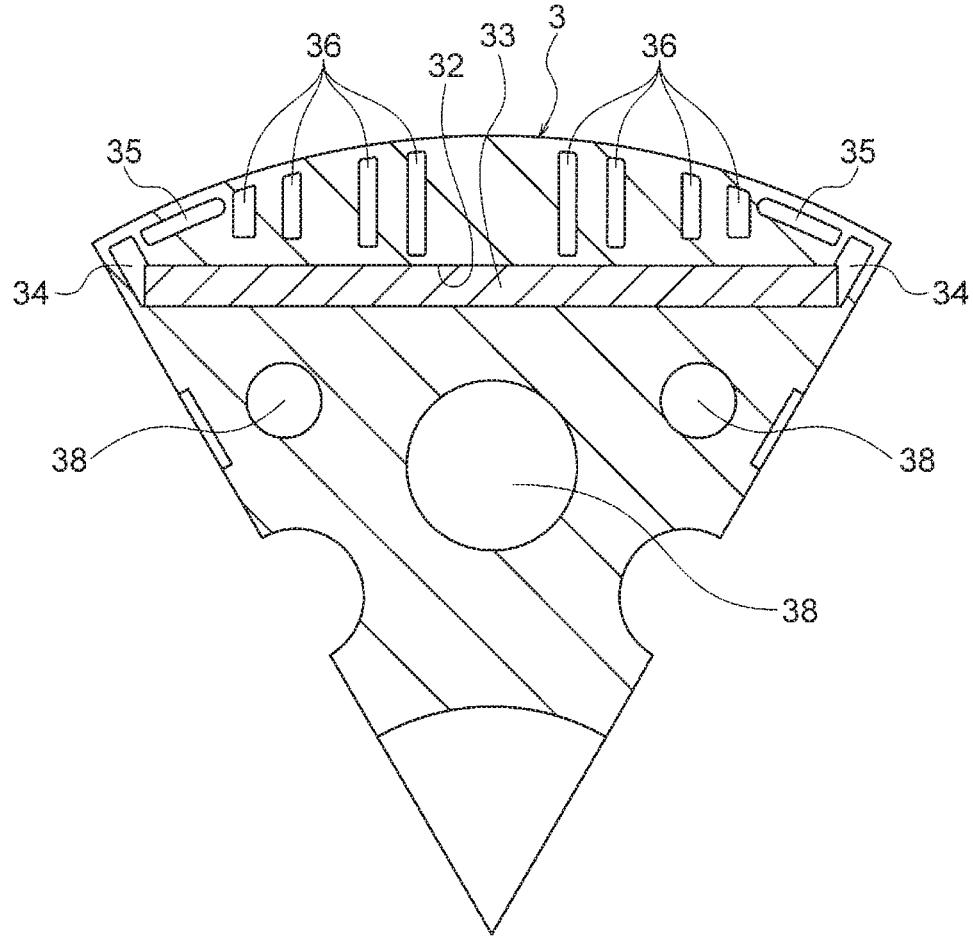
FIG. 14 is a sectional view showing a rotor according to a second configuration example of the motor of the second embodiment.

FIG. 14 is an enlarged sectional view showing a rotor 3 of a motor according to a second configuration example of the second embodiment. In the second configuration example shown in FIG. 14, a plurality of radially elongated slits 36 (second slits) are provided on the radially outer side of the magnet insertion hole 32 of the rotor core 31, in addition to the above described slits 35.

In this example, a plurality of (for example, 8) slits 36 are formed for one magnet insertion hole 32. The slits 36 are located between two slits 35 located at both ends of the magnet insertion hole 32 in the circumferential direction. The slits 36 serve to suppress flow of magnetic flux and increase magnetic resistance.

By providing the slits 36, torque ripple can be suppressed. Further, by providing the slits 36, a force with which magnetic flux generated by current of the coils 2 attracts the rotor core 31 decreases, and therefore a radial excitation force can be suppressed.

The aluminum wire has a specific gravity as low as about ⅓ that of the copper wire, and therefore a weight of the motor becomes lighter by using the coils 2 made of the aluminum wires as described above. Thus, torque ripple is likely to result in vibration and noise. In the second embodiment, the torque ripple is reduced by provision of the slits 36, and vibration and noise of the motor is suppressed.

Further, by providing the slits 35 and 36, the radial excitation force (electromagnetic excitation force in the radial direction) occurring in the rotor 3 can be reduced. The radial excitation force occurs when the rotor core 31 is attracted by magnetic flux generated by current of the coils of the stator 1 when the shaft of the rotor 3 is decentered due to factors such as assembling variations. When the slits 35 and 36 are provided, the force with which magnetic flux generated by current of the coils 2 attracts the rotor core 31 decreases, and therefore the radial excitation force can be suppressed. Thus, vibration and noise of the motor can be further suppressed.

Incidentally, although 8 slits 36 are provided for each magnet insertion hole 32 in FIG. 14, the number of slits 36 is not limited. Further, although both of the circumferentially extending slits 35 and the radially extending slits 36 are provided in the rotor core 31 in FIG. 14, it is also possible to provide the radially extending slits 36 only.

Figure 15:
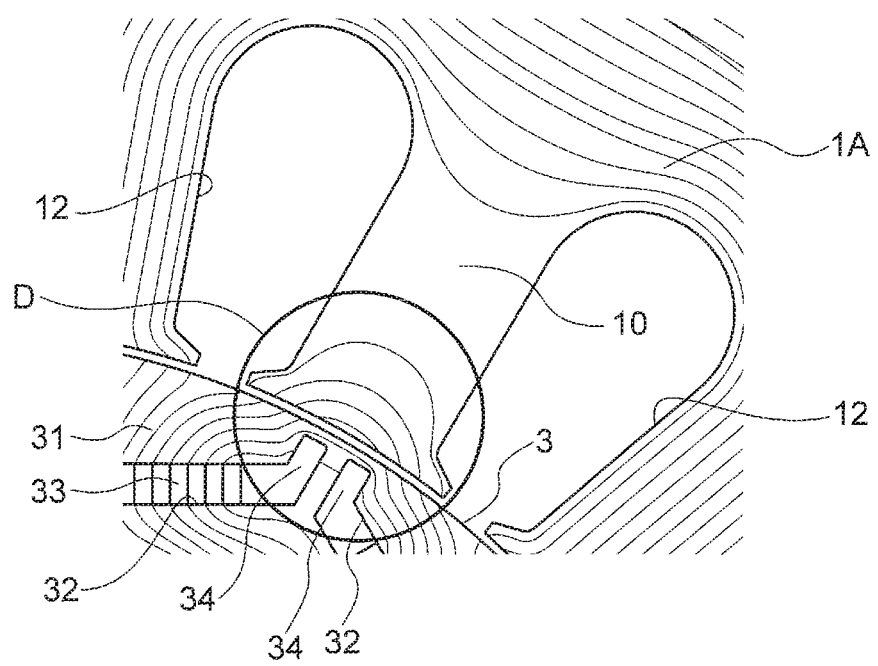
FIG. 15 is a diagram showing a simulation result of magnetic flux in an inter-pole part of a motor including a rotor having no slit.
Figure 16:
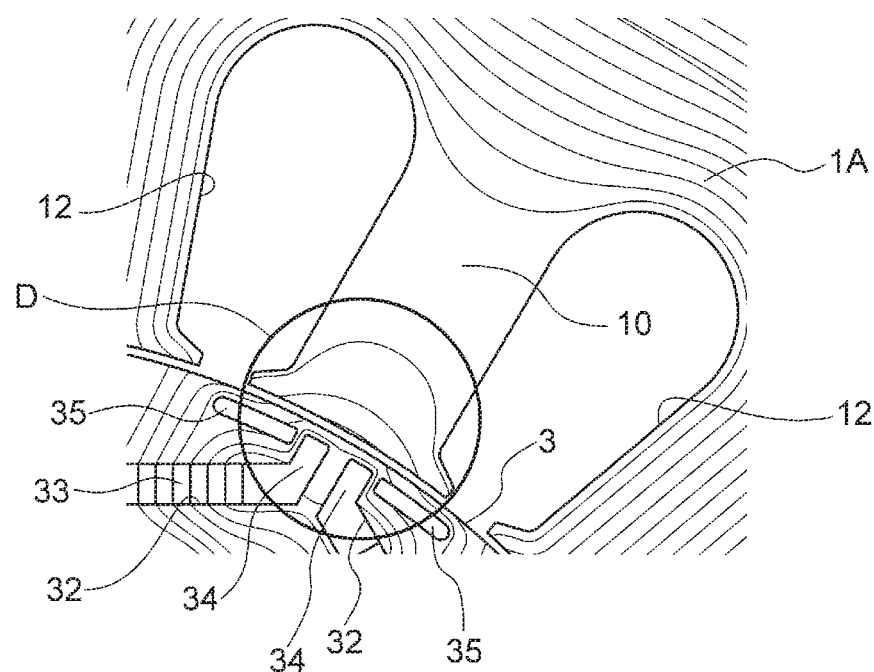
FIG. 16 is a diagram showing a simulation result of magnetic flux an inter-pole part of a motor including a rotor having slits.

FIGS. 15 and 16 are schematic views showing simulation results of flow of magnetic flux in the inter-pole parts of the rotor 3 having no slit 35 (FIG. 1(A)) and the rotor 3 having the slits 35 (FIG. 13). As shown in FIG. 15, in the rotor 3 having no slit 35, magnetic flux generated by the permanent magnets 33 flows into adjacent permanent magnet 33 through an outer circumferential part of the rotor core 31 and the stator core 1A, as encircled by a circle D in the figure. In other words, leakage magnetic flux flowing through the inter-pole part occurs. The leakage magnetic flux is unnecessary magnetic flux that does not contribute to generating a driving force of the motor.

In contrast, as shown in FIG. 16, in the rotor 3 having the slits 35 (FIG. 13), the magnetic flux flowing through the inter-pole part decreases as encircled by a circle D in the figure. This is because the slits 35 located at the ends of the magnet insertion holes 32 in the circumferential direction block the flow of magnetic flux, and increases the magnetic resistance of the inter-pole part. In this way, as the slits 35 are provided on the outer circumferential side of the rotor core 31, leakage magnetic flux can be suppressed, and the amount of magnetic flux contributing to generating a driving force of the motor can be increased. Thus, a current value required to obtain a target output can be reduced, and copper loss can be reduced.

Figure 17:
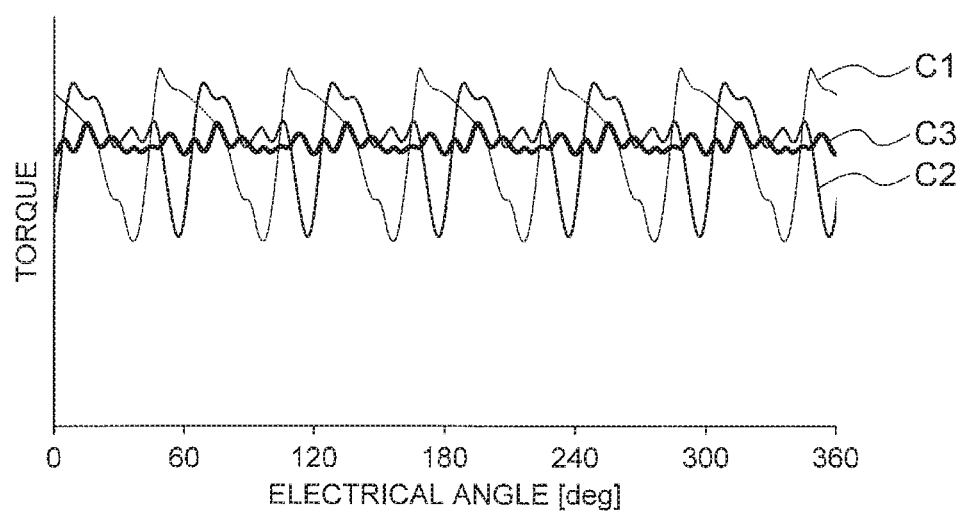
FIG. 17 is a graph showing a numerical analysis result of a torque fluctuation in each of a rotor having no slit, a rotor having first slits, and a rotor having first and second slits.

FIG. 17 is a graph showing a numerical analysis result of a torque fluctuation in each of the motor including the rotor 3 having no slit (FIG. 1(A)), the motor including the rotor 3 having the slits 35 (FIG. 13), and the motor including the rotor 3 having the slits 35 and 36 (FIG. 14). In FIG. 17, a vertical axis represents a torque, and a horizontal axis represents an angle of rotation (electrical angle) of the rotor 3.

In FIG. 17, a curve C1 indicates a torque fluctuation in the motor including the rotor 3 having no slit (FIG. 1(A)). A curve C2 indicates a torque fluctuation in the motor including the rotor 3 having the slits 35 (FIG. 13). A curve C3 indicates a torque fluctuation in the motor including the rotor 3 having the slits 35 and 36 (FIG. 14).

FIG. 18 is a graph showing values of torque ripples respectively calculated from the curves C1, C2 and C3 shown in FIG. 17. From FIGS. 17 and 18, the amount of torque ripple greatly decreases in the motor including the rotor 3 having the slits 35 and 36 (curve C3).

As described above, in the second embodiment of the present invention, leakage magnetic flux can be suppressed by providing circumferentially extending slits 35 on the radially outer side of the permanent magnets 33 (that is, on the radially outer side of the magnet insertion holes 32) of the rotor core 31.

Particularly, leakage magnetic flux can be effectively suppressed by locating the slits 35 so as to face both ends of the permanent magnet 33 in the circumferential direction.

Further, torque ripple can further be suppressed by providing the radially extending slits 36 on the radially outer side of the permanent magnets 33 of the rotor core 31. When the coils 2 are made of aluminum wires, the weight of the motor decreases, and vibration and noise are likely to occur due to torque ripple. However, vibration and noise can be suppressed by suppressing the torque ripple in the second embodiment.

(Air Conditioning Apparatus)

Figure 19:
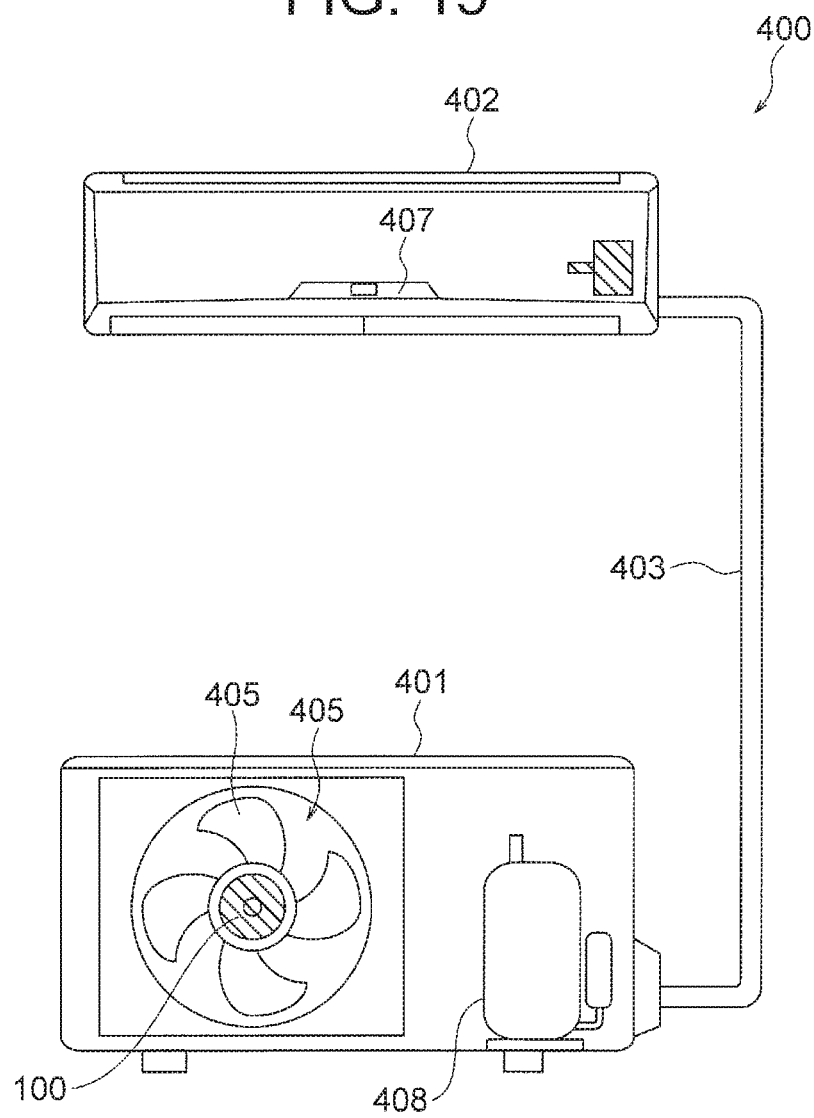
FIG. 19 is a view showing an air conditioning apparatus including a fan to which the motor of each of the embodiments is applied.

Next, an air conditioning apparatus employing the motor according to each of the above described embodiments will be described. FIG. 19 is a view showing a configuration of an air conditioning apparatus 400 employing the motor according to each of the embodiments. The air conditioning apparatus 400 includes an outdoor unit 401, an indoor unit 402, and a refrigerant pipe 403 connecting these units.

The outdoor unit 401 has an outdoor fan 405 as a fan. The indoor unit 402 has an indoor fan 407. FIG. 19 also shows a compressor 408 that compresses refrigerant in the outdoor unit 401.

The outdoor fan 405 of the outdoor unit 401 has a motor 100 to which the motor described in each of the embodiments is applied. A blade 406 is fixed to the shaft 37 (FIG. 1(A)) of the motor 100. When the rotor 3 (FIG. 1(A)) of the motor 100 rotates, the blade 406 fixed to the shaft 37 rotates and blows air outside the room.

When the air conditioning apparatus 400 performs a cooling operation, heat is released when the refrigerant compressed by the compressor 408 is condensed by a condenser (not shown), and the heat is released outdoor by the air blown by the outdoor fan 405.

As described above, since the motor of each of the embodiments can reduce the manufacturing cost and suppress the copper loss, the manufacturing cost of the air conditioning apparatus 400 can be reduced and its operation efficiency can be enhanced. Further, since the motor described in the second embodiment can suppress vibration and noise, vibration and noise of the air conditioning apparatus 400 can be suppressed to be smaller than or equal to standard values.

In this example, the motor described in each of the embodiments is applied to the motor 100 of the outdoor fan 405 of the outdoor unit 401. However, it is also possible to apply the motor of each of the embodiments to the indoor fan 407 of the indoor unit 402.

(Scroll Compressor)

Figure 20:
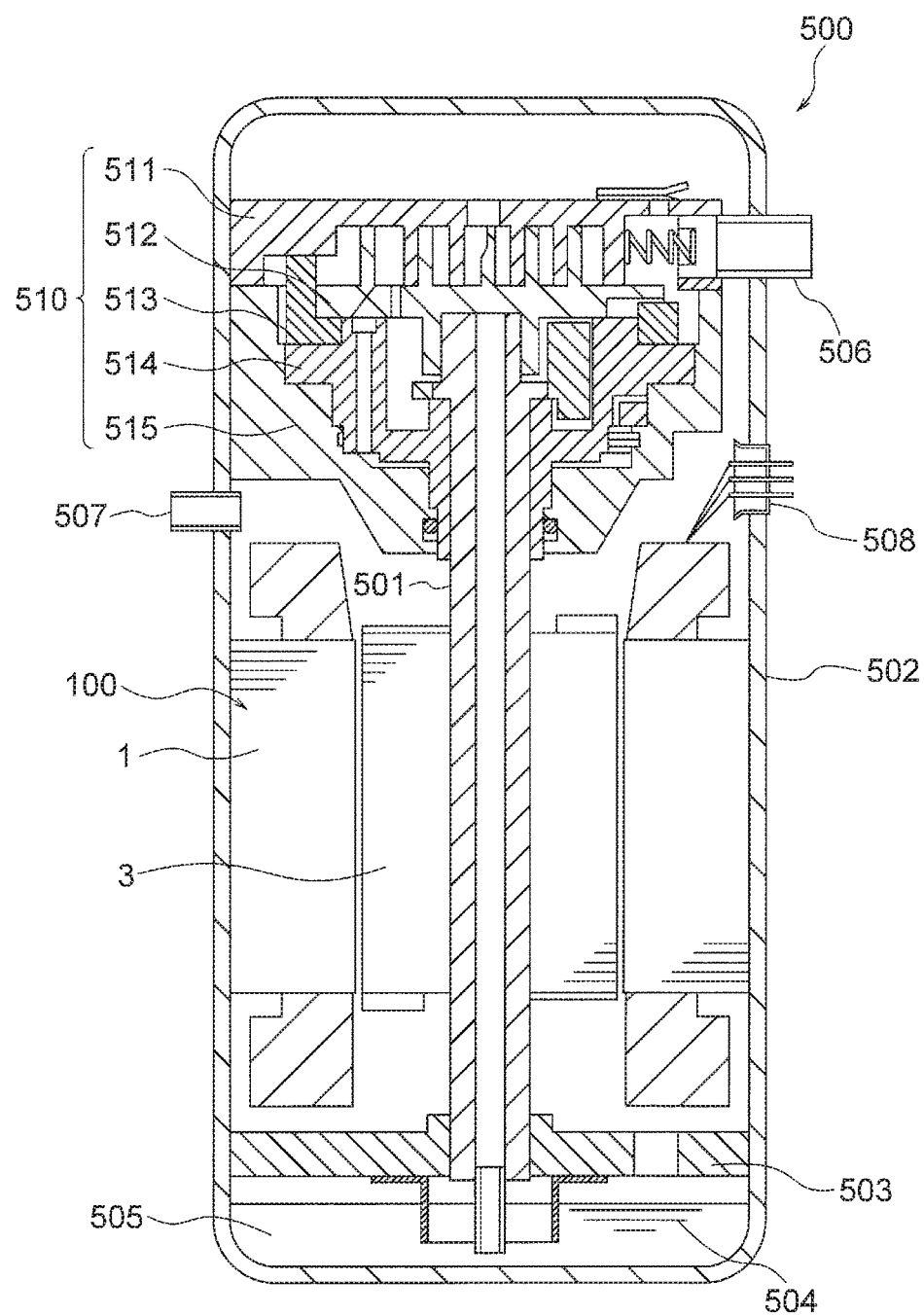
FIG. 20 is a view showing a compressor to which the motor of each of the embodiments is applied.

Next, a scroll compressor employing the motor according to each of the above described embodiments will be described. FIG. 20 is a sectional view showing a configuration of a scroll compressor 500 employing the motor according to each of the above described embodiments.

The scroll compressor 500 includes a closed container 502 housing respective components, a compression mechanism 510, a motor 100 driving the compression mechanism 510, a main shaft 501 connecting the compression mechanism 510 and the motor 100, a sub-frame 503 supporting an end (auxiliary shaft portion) of the main shaft 501 opposite to the compression mechanism 510, and refrigerating machine oil 504 stored in an oil sump 505 at a bottom of the closed container 502.

The compression mechanism 510 includes a fixed scroll 511 and an oscillating scroll 512 combined together to form a compression chamber between respective plate-like spiral teeth, an Oldham ring 513, a compliant frame 514, and a guide frame 515.

An intake pipe 506 penetrating the closed container 502 is press-fitted into the fixed scroll 511. Further, a discharge pipe 507 through which a high-pressure refrigerant gas discharged from a discharge port of the fixed scroll 511 is discharged to outside (refrigeration cycle) is provided to penetrate the closed container 502.

A glass terminal 508 for electrically connecting the stator 1 of the motor 100 to a driving circuit is fixed to the closed container 502 by welding. The motor according to each of the embodiments is applied to the motor 100.

As described above, since the motor of each of the embodiments can reduce the manufacturing cost and suppress copper loss, manufacturing cost of the scroll compressor 500 can be reduced and its operation efficiency can be enhanced. Further, since the motor described in the second embodiment can suppress vibration and noise, vibration and noise of the scroll compressor 500 can be suppressed to be smaller than or equal to standard values.

Although the scroll compressor 500 has been described as an exemplary compressor herein, the motor of each of the embodiments may also be applied to compressors other than the scroll compressor 500.

While preferred embodiments of the present invention have been described in detail above, the present invention is not limited to the above described embodiments, and various changes or modifications may be made without departing from the scope of the present invention.

What is claimed is:

1. A motor comprising a stator and a rotor provided inside the stator,
    the stator comprising:
    a stator core having a plurality of teeth and a plurality of slots each of which is formed between two adjacent teeth of the plurality of teeth, and
    coils made of aluminum and wound on the stator core in distributed winding, the coils being inserted into the slots,
    the rotor comprising:
    a rotor core, and
    a plurality of permanent magnets mounted in the rotor core,
    wherein the rotor core has at least one through-hole formed on an inner side of the permanent magnets in a radial direction of the rotor core, the through-hole allowing a refrigerant of a compressor to pass,
    wherein the coils of the stator are covered with varnish,
    wherein the number of the permanent magnets is greater than or equal to 8, and is less than or equal to 10, the number of the permanent magnets corresponding to the number of poles of the rotor,
    wherein each of the coils is wound across three of the teeth,
    wherein the number of the slots is three times the number of the permanent magnets, and
    wherein each of the permanent magnets of the rotor contains neodymium, iron, boron and dysprosium, and has a dysprosium content of 0 to 4 weight percent.

2. The motor according to claim 1, wherein the rotor core has a plurality of magnet insertion holes in which the permanent magnets are inserted,
    wherein each of the magnet insertion holes extends linearly in a plane perpendicular to an axial direction of the rotor core.

3. The motor according to claim 2, wherein the rotor core has an opening at an end of each of the magnet insertion holes in a circumferential direction of the rotor core.

4. The motor according to claim 1, wherein the rotor core has a first slit on an outer side of each of the permanent magnets in the radial direction of the rotor core, the first slits extending in a circumferential direction of the rotor core.

5. The motor according to claim 4, wherein the first slit is located so as to face an end of each of the permanent magnets in the circumferential direction.

6. The motor according to claim 1, wherein the rotor core has a second slit on an outer side of each of the permanent magnets in the radial direction of the rotor core, the second slit extending in the radial direction of the rotor core.

7. A fan comprising the motor according to claim 1 and a blade rotated by the motor, and a motor rotating the blade, the motor comprising a stator and a rotor provided inside the stator,
    the stator comprising:
    a stator core having a plurality of teeth and a plurality of slots each of which is formed between two adjacent teeth of the plurality of teeth, and
    coils made of aluminum and wound on the stator core in distributed winding, the coils being inserted into the slots,
    the rotor comprising:
    a rotor core, and
    a plurality of permanent magnets mounted in the rotor core,
    wherein the rotor core has at least one through-hole formed on an inner side of the permanent magnets in a radial direction of the rotor core, the through-hole allowing a refrigerant of a compressor to pass,
    wherein the coils of the stator are covered with varnish,
    wherein the number of the permanent magnets is greater than or equal to 8, and is less than or equal to 10, the number of the permanent magnets corresponding to the number of poles of the rotor,
    wherein each of the coils is wound across three of the teeth,
    wherein the number of the slots is three times the number of the permanent magnets, and
    wherein each of the permanent magnets of the rotor contains neodymium, iron, boron and dysprosium, and has a dysprosium content of 0 to 4 weight percent.

8. An air conditioning apparatus comprising an outdoor unit, an indoor unit, and a refrigerant pipe connecting the outdoor unit and the indoor unit,
    at least one of the outdoor unit and the indoor unit comprising a fan,
    the fan comprising the motor according to claim 1 and a blade rotated by the motor.

9. A compressor comprising a closed container, a compression mechanism provided in the closed container, and a motor driving the compression mechanism, the motor comprising a stator and a rotor provided inside the stator, the stator comprising:

a stator core having a plurality of teeth and a plurality of slots each of which is formed between two adjacent teeth of the plurality of teeth, and coils made of aluminum and wound on the stator core in distributed winding, the coils being inserted into the slots, the rotor comprising:

a rotor core, and a plurality of permanent magnets mounted in the rotor core, wherein the rotor core has at least one through-hole formed on an inner side of the permanent magnets in a radial direction of the rotor core, the through-hole allowing a refrigerant of the compressor to pass, wherein the coils of the stator are covered with varnish, wherein the number of the permanent magnets is greater than or equal to 8, and is less than or equal to 10, the number of the permanent magnets corresponding to the number of poles of the rotor, wherein each of the coils is wound across three of the teeth, wherein the number of the slots is three times the number of the permanent magnets, and wherein each of the permanent magnets of the rotor contains neodymium, iron, boron and dysprosium, and has a dysprosium content of 0 to 4 weight percent.

10. The motor according to claim 1, wherein each of the first number of permanent magnets has a residual magnetic flux density greater than or equal to 1.32 T and less than or equal to 1.39 T.

* * * * *